United States Patent [19]

Wyatt

[11] Patent Number: 5,797,562
[45] Date of Patent: Aug. 25, 1998

[54] AIRCRAFT DISPLAY COMBINING ERROR TAPE AND REFERENCE BUGS

[75] Inventor: Ivan Sandy Wyatt, Scottsdale, Ariz.

[73] Assignee: Honeywell, Inc., Minneapolis, Minn.

[21] Appl. No.: 506,743

[22] Filed: Jul. 26, 1995

[51] Int. Cl.$^6$ ..................................................... G01C 21/00
[52] U.S. Cl. ........................... 244/1 R; 340/973; 340/974; 340/975
[58] Field of Search ................ 244/1 R; 340/971–980; 342/29, 33

[56] References Cited

U.S. PATENT DOCUMENTS

| | | | |
|---|---|---|---|
| 4,583,094 | 4/1986 | Mosier | 340/973 |
| 4,637,535 | 1/1987 | Aleman. | |
| 4,836,426 | 6/1989 | Munn et al. . | |
| 4,976,352 | 12/1990 | Nordstrom | 206/316.2 |
| 5,038,984 | 8/1991 | Izzo . | |
| 5,136,301 | 8/1992 | Bechtold et al. | 244/1 R |
| 5,248,968 | 9/1993 | Kelly et al. | 340/973 |
| 5,250,947 | 10/1993 | Worden et al. | 340/973 |
| 5,369,589 | 11/1994 | Steiner | 342/176 |
| 5,412,382 | 5/1995 | Leard et al. | 340/973 |
| 5,420,582 | 5/1995 | Kubbat et al. | 340/973 |

FOREIGN PATENT DOCUMENTS 1061386  3/1997  United Kingdom .

OTHER PUBLICATIONS

Charles S. Hynes et al.; "Flight Evaluation of Pursuit Displays for Precision Approach of Powered–Lift Aircraft" Jul./Aug. 1989, pp. 521–529.

*Primary Examiner*—Galen L. Barefoot
*Attorney, Agent, or Firm*—Brian C. Downs; Ronald E. Champion

[57] ABSTRACT

An aircraft display combines speed error tapes and multiple speed reference bugs to produce a display which reduces pilot workload. The length of the speed error tape is indicative of the difference between a current aircraft speed and a reference speed. Multiple reference bugs are adjacent to the error tape and are indicative of the difference between the current aircraft speed and other selected reference speeds. The reference bugs move along the error tape thereby communicating the status of the current aircraft speed relative to the multiple reference speeds. The display reduces the need for the pilot to scan and analyze numerous instruments for the same information.

21 Claims, 5 Drawing Sheets

AIRCRAFT DISPLAY COMBINING ERROR TAPE AND REFERENCE BUGS

BACKGROUND OF INVENTION

The present invention relates generally to electronic displays avionics and more specifically to electronic display symbology in an aircraft cockpit.

Electronic displays such as cathode ray tubes (CRTs), flat panels (i.e. LCD's), head-up displays (HUD's), helmet mounted displays (HMD's) and the like are well known and widely used to display information. Aircraft commonly have six or more such electronic displays in the cockpit along with numerous other types of instrumentation.

Prior to the arrival of electronic displays, information was displayed on numerous electromechanical display devices. These devices would typically convey information by mechanically moving armatures, tapes and dials, or by illuminating various indicators. A problem with these devices is that they were located throughout the cockpit and therefore required the pilot to continually "scan" all of the displays. This scanning could lead to pilot fatigue and increase the chance of the pilot overlooking vital information or could lead to more serious pilot error.

The arrival of electronic displays in the cockpit has reduced these problems by allowing much information to be conveniently displayed for the pilot. Electronic displays consolidate the data from many of the formerly electromechanical devices into a more user-friendly display.

While electronic displays have vastly improved the display of information, improvements are still needed. Aircraft complexity has significantly increased. Consequently, pilots must process even more information than previously.

This pilot "overload" problem is especially acute when the pilot is under a high workload such as during landings, takeoffs, collision avoidance, go-arounds, windshear, etc. During such conditions it is vital that the pilot have immediate access to the vital information he needs.

Pilot fatigue would be decreased and safety would be increased by any display which improves the communication of information to the pilot.

Clearly there exists the need for an aircraft display which simplifies cockpit information, reduces the need to scan displays, reduces pilot fatigue, and increases aircraft safety.

SUMMARY OF THE INVENTION

The invention discloses an aircraft display system that combines error tapes and reference bugs to produce a display which reduces pilot workload. The error tape, which is indicative of the difference between a current aircraft parameter and a reference value, is enhanced by multiple reference bugs. The reference bugs are positioned on or adjacent to the error tape and are indicative of the difference between the current aircraft parameter and additional reference values associated with each reference bug. The reference bugs move along length of the error tape thereby communicating to the pilot the status of the current aircraft parameter relative to the additional reference values. The display reduces pilot workload by combining information from two displays into a single display thereby reducing the need for the pilot to scan instruments.

The invention is adaptable to any type of electronic display but the preferred embodiment is implemented on a HUD. More specifically, the invention us particularly useful for enhancing the function of a speed error tape by combining takeoff V-speed bugs with the speed error tape.

Speed error tapes are not new. Previous displays have combined speed error tapes with flight path vector (FPV) symbols. In these displays the error tapes typically rise or descend from the wing of the FPV. The speed error tape represents the difference between the current airspeed of the aircraft and a selected reference speed (e.g. V2). If the selected reference speed is greater than the current airspeed, the error tape descends from the wing. If the selected reference speed is less than the current airspeed, the error tape rises from the wing.

A deficiency in the previous displays was that the pilot had to constantly scan both the speed error tape and the airspeed display which displayed the other V-speeds such as V1 and VR. The invention reduces pilot workload, in this embodiment, by displaying the other V-speeds, V1 and VR, adjacent to the speed error tape.

During takeoff the invention operates as follows. At the beginning of the takeoff roll the speed error tape is fully extended below the FPV. The reference speed bugs (V1, VR, and V2) are adjacent the bottom of the tape. When the current airspeed is within a predetermined velocity of the V1 speed, a indicator bar appears on the tape. Both the indicator bar and the V1 bug move up the tape as the current airspeed approaches V1 speed. As the aircraft reaches V1 speed the indicator bar and V1 bug merge into the FPV symbol and vanish. The VR bug and its associated indicator bar move up the tape in a similar fashion. Finally, the V2 bug and the bottom of the tape move toward the FPV as the aircraft's airspeed approaches V2.

Therefore, objects of the invention are to reduce pilot workload and increase aircraft safety.

A feature of the invention are reference bugs displayed on an error tape.

An advantage of the invention is the ability to monitor reference parameters, such as V-speeds, without eye or head movement to the standard parameter display.

The significant features of the invention are illustrated in the figures and described more fully below.

DETAILED DESCRIPTION

Figure 1:
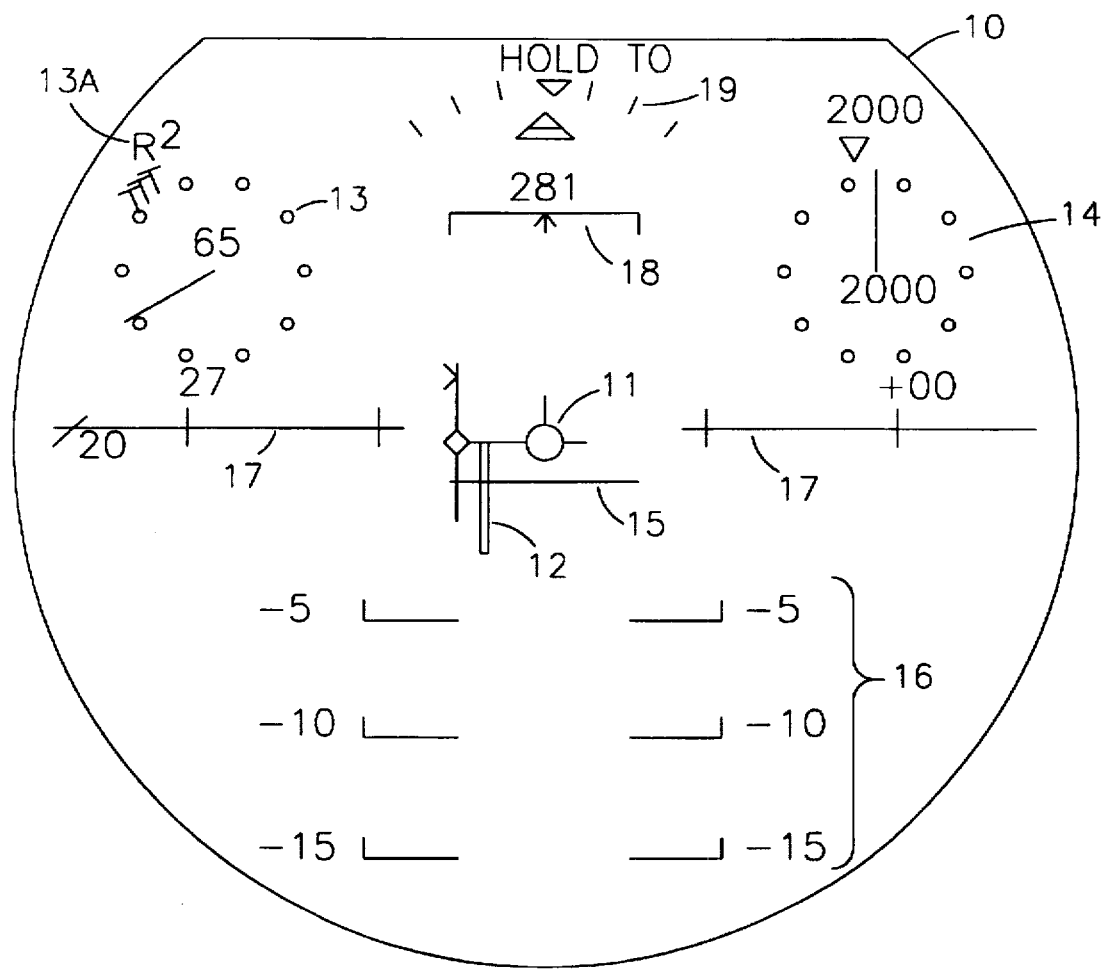
FIG. 1 illustrates the display format of a HUD without the invention.

FIG. 1 illustrates the display format of a HUD without the invention. The display screen 10 communicates various aircraft parameters to the pilot. Symbology includes flight path vector (FPV) 11, speed error tape 12, airspeed indicator 13, vertical speed indicator 14, aircraft reference 15, pitch tape 16, horizon line 17, heading 18, and roll 19.

During takeoff the pilot must scan the speed error tape 12 and the airspeed indicator 13 which displays v-speeds 13A. V-speeds 13A include three bugs, a "1" for V1 speed, an "R" for VR speed and a "2" for V2 speed.

FIGS. 2A through 2F illustrate the invention implemented on a speed error tape during takeoff. Simplified figures are used illustrating only the FPV 11, speed error tape 12, and reference bugs 20. The FPV shown in FIG. 2 is shaped differently from the FPV shown in FIG. 1 but performs the same function. FPV wings 11A are a part of the FPV symbol 11. In the preferred embodiment the speed error tape extends down from a wing 11A of the FPV 11.

Figure 2A:
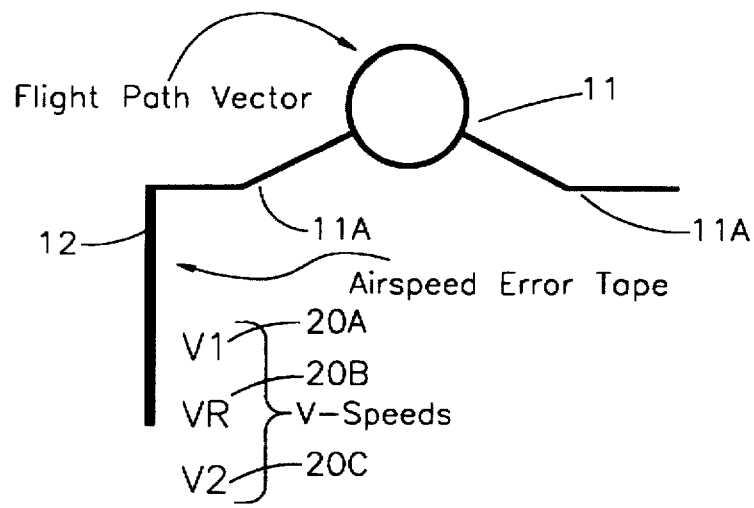
FIGS. 2A through 2F illustrate the invention implemented on a speed error tape during takeoff.

FIG. 2A illustrates the display at the beginning of the takeoff roll. The reference bugs, V1 20A, VR 20B, and V2 20C, are not yet "on scale" and are parked at the second end or bottom of speed error tape 12. The reference bugs are not on scale because the difference between the current airspeed and the reference values are too large. Typically the length of tape 12 represents approximately 15 knots airspeed or less depending on the implementation. The lack of indicator bars on tape 12 indicate that the reference bugs are not yet on scale.

Figure 2B:
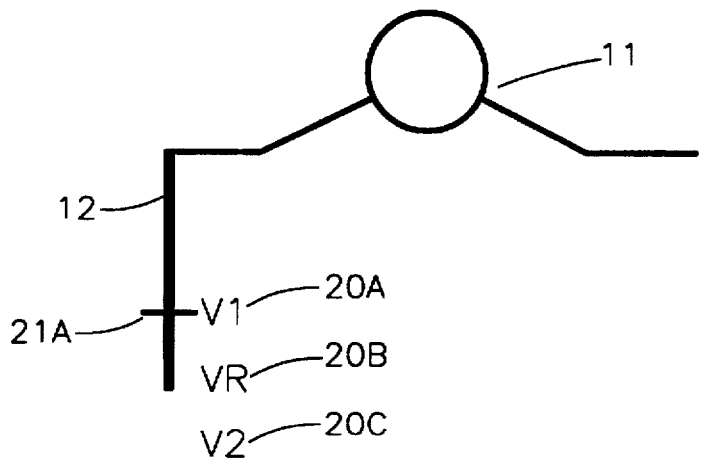

In FIG. 2B the aircraft has accelerated to a speed sufficient to activate (i.e. put the bug "on scale") the V1 bug 20A. This is indicated by the presence of V1 indicator bar 21A. As the aircraft continues to accelerate the V1 bug 20A and the V1 indicator bar 21A will move up tape 12 toward the first end, or top, of error tape 12.

Figure 2C:
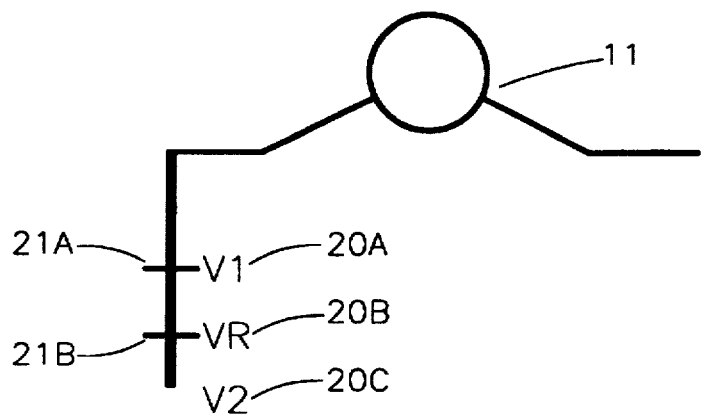

In FIG. 2C both V1 bug 20A and VR bug 20B are on scale as indicated by V1 indicator bar 21A and VR indicator bar 21B.

Figure 2D:
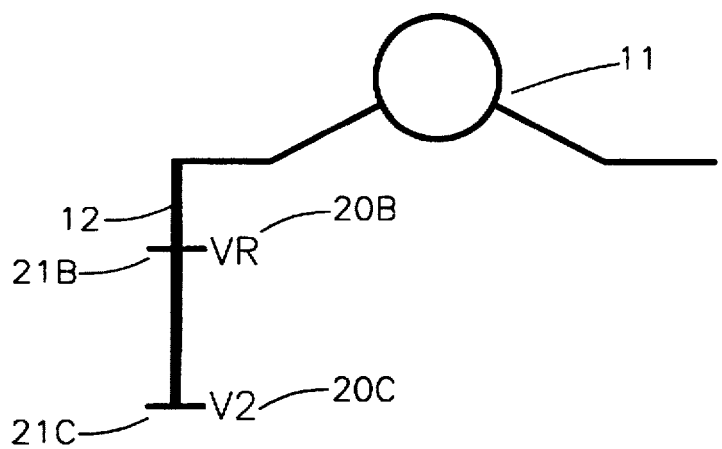

In FIG. 2D the aircraft has accelerated past V1 and the V1 bug 20A and V1 indicator bar 21A have been dropped from the symbology. Both the VR bug 20B and the V2 bug 20C are active as indicated by indicator bars 21B and 21C.

Figure 2E:
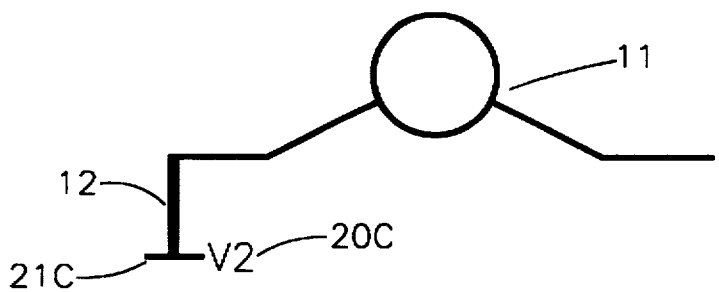

FIG. 2E illustrates the display as the aircraft accelerates past VR speed. VR bug 20B and VR indicator bar 21B are dropped from the symbology. The V2 bug 20C and indicator bar 21C rise along with the second end, or bottom, of tape 12.

Figure 2F:
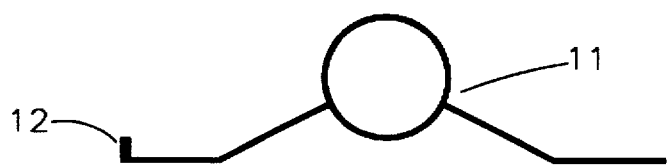

FIG. 2F illustrates the display as the aircraft accelerates past V2 speed. V2 bug 20C and V2 indicator bar 21C are dropped from the symbology. None of the reference bugs 20 or indicator bars 21 will reappear even if the airspeed should fall below one of the "bugged" speeds. The tape 12 will operate as a typical speed error tape representing the difference between the current airspeed and the desired reference speed.

Figure 3:
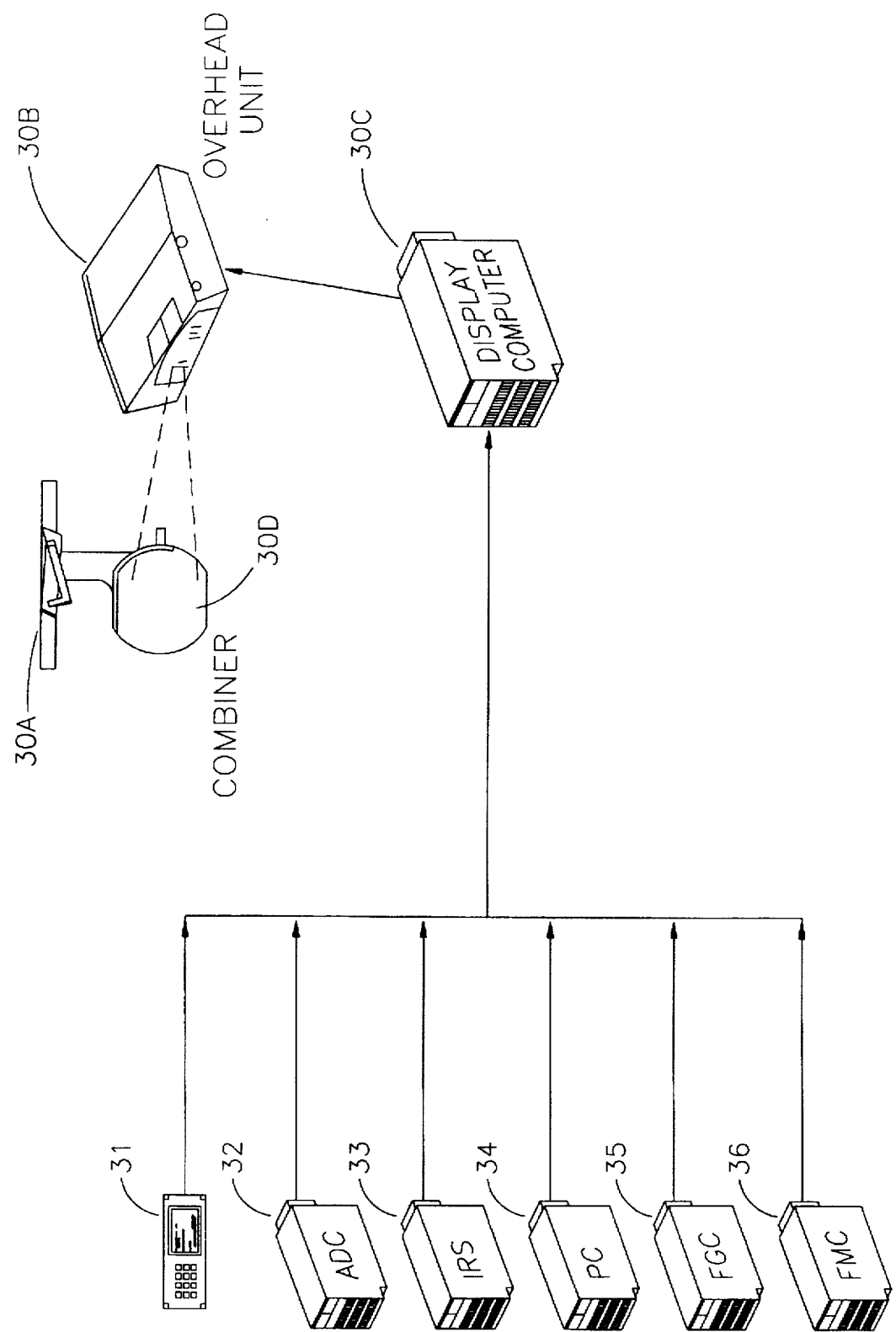
FIG. 3 illustrates the components of the preferred embodiment.

FIG. 3 illustrates the components of the preferred embodiment. The preferred embodiment is implemented on a head-up display (HUD). HUD 30 comprises combiner 30A, overhead unit 30B, and display computer 30C. Display computer 30C communicates display data to overhead unit 30B which projects the display onto the display screen 30D of combiner 30A. The technology of these components is well known in the art and need not be described in further detail.

Those skilled in the art recognize that the invention is not limited to HUD's and may be implemented on any type of display including, but not limited to, CRT's, LCD's, and HMD's. These displays are generically referred to as electronic displays and are interchangeable with HUD 30 for the purposes of the invention.

Electronic display (or HUD) 30 communicates with many other aircraft systems depending on the specific implementation. These aircraft systems may include display controllers 31, airdata computers (ADC) 32, inertial reference systems (IRS) 33, performance computers 34, flight guidance computers 35, flight management computes 36, and the like.

Display controller 31 communicates commands (e.g. on/off, mode, brightness, etc.) to electronic display 30. Airdata computer 32 communicates airspeeds, mach numbers, altitudes, vertical speeds, and the like. Inertial reference system 33 communicates acceleration data, attitude data, heading and position data, etc. Performance computer 34 communicates optimal flight path and cost information. Flight guidance computer 35 communicates guidance parameters. Flight management computer 36 communicates information including flight path information and waypoints.

Figure 4:
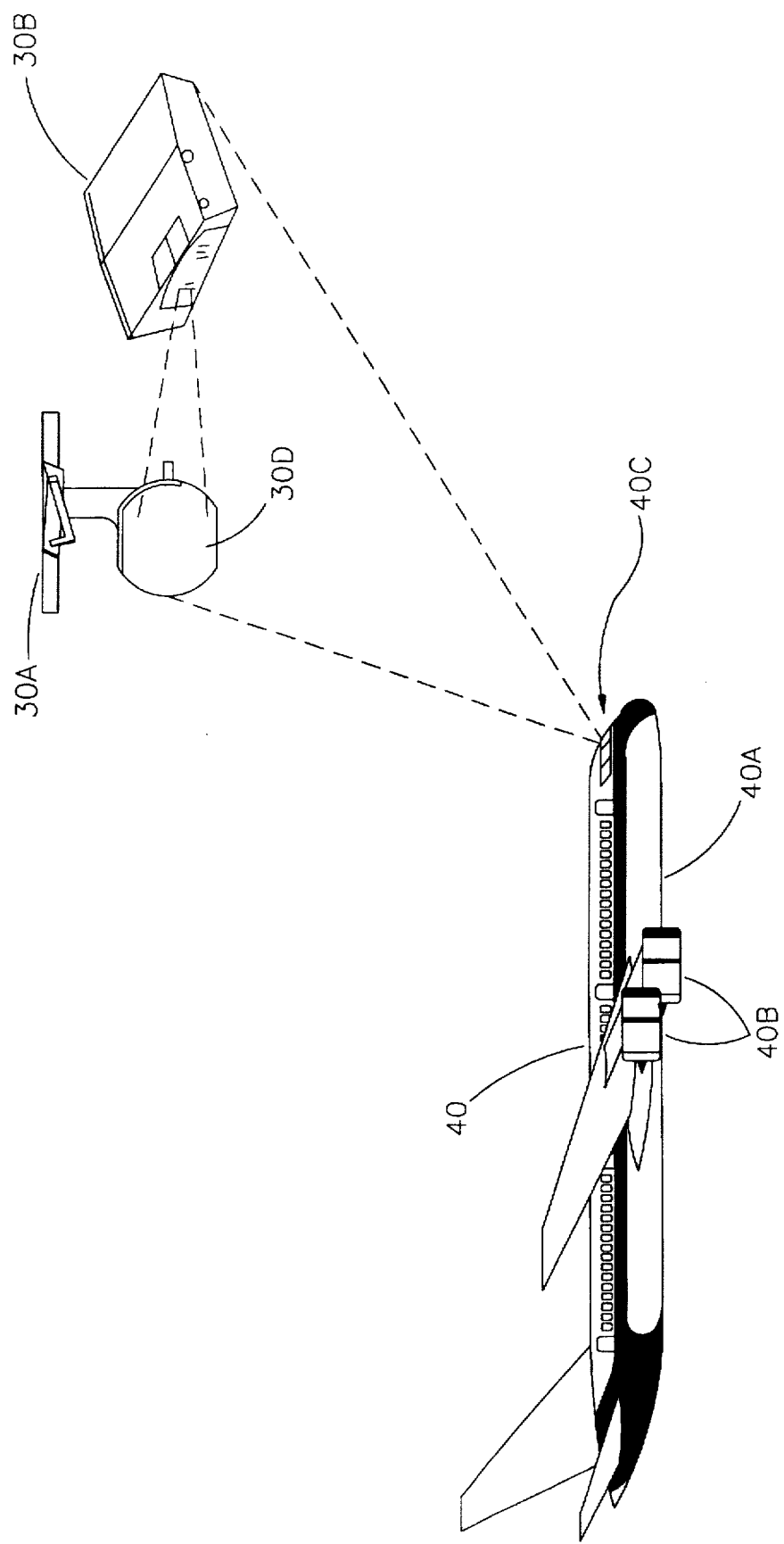
FIG. 4 illustrates the invention embodied in an aircraft.

FIG. 4 illustrates the invention embodied in an aircraft. Aircraft 40 includes a frame 40A, engines 40B, cockpit 40C and electronic display 30 (shown external to the aircraft 40).

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result are therefore equivalent to the invention. Alternate embodiments envisioned include, but are not limited to, new electronic display devices which may be developed and using the invention in other vehicles such as automobiles, trucks, trains and boats.

It is clear from the foregoing that the present invention represents a new and useful display symbology and apparatus for displaying information on electronic displays and the like.

The embodiments of an invention in which an exclusive property or right is claimed are define as follows:

1. A display apparatus for an aircraft comprising:
   a) an electronic display unit having,
      1) a display screen,
      2) a flight path vector symbol displayed on said screen,
      3) a speed error tape displayed on said screen, said tape having a first end and a second end, said first end adjacent said flight path vector symbol, said tape extending from said symbol to said second end,
      4) at least one speed bug positioned adjacent to said tape, each of said bugs representative of an associated reference speed, and,
      5) whereas the position of said speed bug relative to said first end of said tape is indicative of the difference between a current speed of said aircraft and said associated reference speed and once the associated reference speed is achieved said bug vanishes.

2. The display apparatus according to claim 1 wherein said electronic display unit is a HUD.

3. The display apparatus according to claim 1 wherein said electronic display unit is a CRT.

4. The display apparatus according to claim 1 wherein said electronic display unit is an LCD.

5. The display apparatus according to claim 1 wherein said flight path vector symbol includes a wing from which said tape extends.

6. The display apparatus according to claim 1 wherein said at least one speed bug includes at least one speed bug representative of a takeoff reference speed.

7. The display apparatus according to claim 6 wherein said at least one speed bug includes a V1 speed bug representative of a v1 speed of said aircraft.

8. The display apparatus according to claim 6 wherein said at least one speed bug includes a V2 speed bug representative of a v2 speed of said aircraft.

9. The display apparatus according to claim 6 wherein said at least one speed bug includes a VR speed bug representative of a VR speed of said aircraft.

10. The display apparatus according to claim 1 wherein the length of said error tape is representative of the difference between said current speed and a predetermined selected reference speed.

11. An information display device for vehicles comprising:
   a) electronic display means for displaying information to an operator, said display means having:
      1) a display screen;
   b) an error tape displayed by said display means on said display screen, the length of said tape being variable and representative of a difference between a current vehicle parameter and a primary reference value; and,
   c) at least one reference bug displayed on said display screen, said bugs positioned adjacent said tape, said bugs being moveable along the length of said tape, the position of each of said bugs along said tape indicative of a difference between said current aircraft parameter and a secondary reference parameter associated with each of said bugs and once the reference parameter is achieved said at least one reference bug vanishes.

12. An information display device for vehicles according to claim 11 further comprising a flight path vector symbol displayed on said display screen, said error tape emanating from said flight path vector symbol.

13. An information display device for vehicles according to claim 12 wherein said current vehicle parameter is velocity.

14. An information display device for vehicles according to claim 13 wherein said vehicle is an aircraft and reference bugs are representative of V-speeds of said aircraft.

15. An information display device for vehicles according to claim 14 wherein said vehicle is an aircraft and reference bugs include a V1 reference bug representative of a v1 speed of said aircraft.

16. An information display device for vehicles according to claim 14 wherein said vehicle is an aircraft and reference bugs include a VR reference bug representative of a VR speed of said aircraft.

17. An information display device for vehicles according to claim 14 wherein said vehicle is an aircraft and reference bugs include a v2 reference bug representative of a v2 speed of said aircraft.

18. An information display device for vehicles according to claim 14 wherein said electronic display means is a HUD.

19. An information display device for vehicles according to claim 14 wherein said electronic display means is a LCD.

20. An information display device for vehicles according to claim 14 wherein said electronic display means is a CRT.

21. A vehicle comprising:
   a) a frame;
   b) an engine support by said frame; and,
   c) an electronic display supported by said frame, said display having,
      1) a display screen,
      2) a flight path vector symbol displayed on said screen,
      3) a speed error tape displayed on said screen, said tape having a first end and a second end, said first end adjacent said flight path vector symbol, said tape extending from said symbol to said second end,
      4) at least one speed bug positioned adjacent to said tape, each of said bugs representative of an associated reference speed, and,
      5) whereas the position of said speed bug relative to said first end of said tape is indicative of the difference between a current speed of said aircraft and said associated reference speed and once the associated reference speed is achieved said bug vanishes.

* * * * *